United States Patent [19]

Santalini

[11] Patent Number: 4,640,397
[45] Date of Patent: Feb. 3, 1987

[54] ELECTROMECHANICAL FRICTION BRAKE FOR ACTUATING AND STOPPING A ROTATING ELEMENT IN PREDETERMINED POSITIONS

[75] Inventor: Antonio Santalini, Arconate, Italy

[73] Assignee: Rockwell-Rimoldi S.p.A., Italy

[21] Appl. No.: 758,915

[22] Filed: Jul. 25, 1985

[30] Foreign Application Priority Data

Mar. 5, 1985 [IT] Italy ............................. 19757 A/85

[51] Int. Cl.⁴ ...................... F16D 13/40; F16D 13/64; F16D 69/02
[52] U.S. Cl. .................. 192/18 B; 188/71.2; 188/161; 188/251 A; 188/251 M; 192/107 M
[58] Field of Search ............... 188/71.2, 161, 162, 188/163, 164, 165, 251 A, 251 M; 192/18 B, 107 M; 310/76, 77, 93; 318/304, 372

[56] References Cited

U.S. PATENT DOCUMENTS

| | | | |
|---|---|---|---|
| 2,251,410 | 8/1941 | Koehring et al. | 188/251 M |
| 2,659,830 | 11/1953 | Mason et al. | 310/76 |
| 4,523,668 | 6/1985 | Uematsu et al. | 188/251 A X |

*Primary Examiner*—Andres Kashnikow
*Assistant Examiner*—Richard R. Diefendorf

[57] ABSTRACT

An electromechanical friction clutch and brake unit is disclosed for actuating and stopping a rotating element for example, an actuating shaft of the needle of a sewing machine. The clutch and brake unit has inside it a plurality of friction elements which are mutually engageable in substantial contact, with the interposition of oil of suitable viscosity, and the friction elements are made at least partly of on oil-impregnated, sintered, metallic material, so as to form reservoirs capable of supplying the oil by means of capillarity.

6 Claims, 1 Drawing Figure

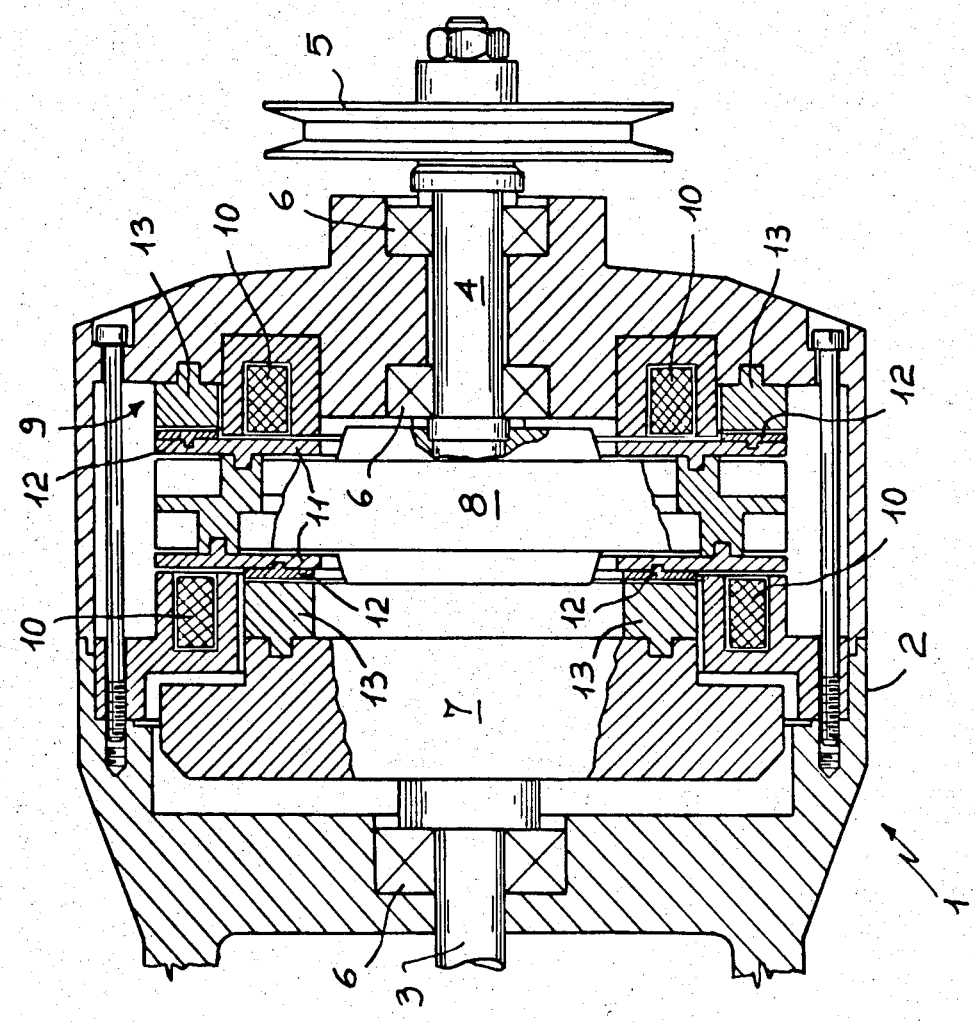

ELECTROMECHANICAL FRICTION BRAKE FOR ACTUATING AND STOPPING A ROTATING ELEMENT IN PREDETERMINED POSITIONS

BACKGROUND OF THE INVENTION

The present invention relates to an electromechanical friction clutch and brake unit particularly for actuating and stopping a rotating element.

As is known, several technical sectors make use of electromagnetic friction clutch and brakes which are capable of actuating and stopping with due reliability a rotating element. In this respect, electromechanical friction clutch and brakes for sewing machines are known and widespread, which friction clutch and brakes ensure the immediate stoppage of the sewing machines.

The example of friction clutch and brake units for sewing machines is of considerable importance since it is precisely these machines which require brakes which must withstand difficult operating conditions. In fact, the said brakes must act on rotating elements which are usually able to reach speeds in the region of 10,000 revolutions per minute, and during a sewing operation the stopping and restarting phases are continually repeated. In practice, the brake must act continually, without showing any signs of failure. Moreover, in the case of these machines, the said brake must be substantially small in size. In particular, the currently known friction clutch and brake units for sewing machines are structured in accordance with various technical solutions. They have, nevertheless, some common components: a flywheel integral with a drive shaft, coupling disk integral with a driven shaft and selectively engageable, upon command, with the said flywheel and with stopping means. Also common is the provision of control and actuating means which are capable of causing the selective engagement of the said coupling disk against the fly wheel or against the stopping means. If the coupling disk is a normal, rigid disk, the control and actuating means displace the said coupling disk between the said flywheel and the said stopping means. If the coupling disk is an elastic disk sensitive to magnetic attraction, the control and actuating means deform this elastic disk so as to direct it either toward the flywheel or toward the stopping means. In other cases, the control and actuating means act in the manner of a pulsed brake or else act by means of magnetic attraction on a coupling disk formed mainly of magnetic particles.

In any case, the braking action is such that it reduces the number of revolutions of the coupling disk to approximately 250-300 revolutions per minute and then stops it immediately when a predetermined position is reached. With this process, a sewing machine performs no more than 3 to 5 stitches in between the stop command and the final immediate stoppage which occurs in such a way that the needle is situated at the top dead center or the bottom dead center with a very small margin of error.

The stopping means mentioned may be of various types, for example simple parts of a fixed housing surrounding the brake, against which the said coupling disk, or even an auxiliary electric motor unit which controls both the angular position and the axial position of the coupling disk, is arranged in a discontinuous manner.

In each case, all of the electromechanical positioning friction clutch and brake units currently known, in the particularly important sector of sewing machines, are provided with special friction elements which are inserted in the already mentioned means and are able to ensure an effective braking action and a degree of wear which at least lies within the limits of acceptability directly resulting from intense use of these machines and the need to stop them as little as possible for maintenance or overhauls. These friction elements are quite special since they must be inserted in elements rotating at very high speeds and consequently they must also be very light in weight.

In order to satisfy these difficult and contrasting requirements of long duration, maximum lightness and a suitable coefficient of friction, friction elements formed from a mixture of natural and synthetic products which have been suitably blended and treated have been universally used. In particular, friction elements made of cork have been used, on account of its lightness and low cost and in particular on account of the fact that it can be thoroughly impregnated with oil of suitable viscosity. This oil protects the cork or similar material from direct contact, and, because of its viscosity, is able to ensure an adequate coefficient of friction.

It has been shown that, for as long as the cork or similar material remains impregnated with oil, the brake possesses satisfactory characteristics, but as soon as the oil is used up and the braking action is performed as a result of direct contact of the cork, the latter becomes worn to the point of reducing the braking efficiency. It has not been possible to overcome this serious drawback by making the friction elements large in size, since cork is unable to withstand bending and twisting: it must be arranged in very thin layers. As a result of this fact, the quantity of oil stored inside the cork is also relatively limited.

In practice, electromagnetic friction clutch and brake units with different structures exist nowadays, but all of them are mainly based, at least recently, on the use of friction elements made of cork or a similar oil-impregnated mixture. Consequently, the friction clutch and brake units which exist nowadays are lightweight and in many respects satisfactory, and even last well with time, but are not such that the brakes themselves do not constitute a critical element in industrial sewing machines, with regard to their maintenance. In these circumstances, the technical task underlying the present invention is to devise an electromagnetic friction clutch and brake unit particularly of the type mentioned, which is able to overcome the drawbacks of the current state of the art, whilst ensuring perfect operation and minimum wear with time.

SUMMARY OF THE INVENTION

Within the scope of this technical task, it is an important aim of the present invention to devise an electromagnetic friction clutch and brake unit for actuating and stopping a rotating element as the needle actuating shaft of a sewing machine, which has a simple and highly practical structure and can be manufactured at a low cost and on a large scale by the industries in this sector.

The technical task mentioned and the aim specified are substantially achieved by an electromechanical friction clutch and brake unit of the type comprising: a housing mounting one flywheel integral with a drive shaft, one coupling disk which is integral with a driven shaft and selectively engageable, upon command, with the said flywheel and with stopping means arranged on the housing, control and actuating means which are capable of causing the selective engagement of the said coupling disk. A plurality of friction elements against said fly wheel or against said stopping means which are mutually engageable by means of substantial contact, with the interposition of oil of suitable viscosity, and are operated between the said flywheel, the said coupling disk and the said stopping means. The said friction elements of the said electromechanical friction clutch and brake unit are made, at least partly, of an oil-impregnated, sintered, metallic material forming an oil reservoir capable of supplying the said oil by means of capillarity.

BRIEF DESCRIPTION OF THE DRAWINGS

Further characteristic features and advantages will emerge more clearly from the description of a preferred, but not exclusive, embodiment of the invention, illustrated by way of a non-limiting example in the attached plate of drawings, in which: the single FIGURE shows, in partial cross-section and split, an entire electromechanical positioning friction brake according to the invention.

DESCRIPTION OF THE INVENTION

With reference to the FIGURE, the friction clutch and brake unit according to the invention is indicated overall by the reference number 1. It comprises, externally, a housing 2 through which pass, on one side, a drive shaft 3 and, on the opposite side, a driven shaft 4 carrying a pulley 5. The shafts 3 and 4 are held by suitable bearings 6.

The drive shaft 3 is integral with a flywheel 7, while the driven shaft 4 is integral with a coupling or engaging disk 8 facing and located parallel to the flywheel 7. The coupling or engaging disk 8 can be coupled, on one side, with the flywheel 7, and, on the opposite side, with stopping means 9 integral with the housing 2. In order to activate engagement of the engaging disk 8, control and actuating means, partly known per se and not illustrated, are provided. On the other hand, an original and illustrated part of the said control and actuating means consists of two or more electromagnetic coils 10 which are fixed to the housing 2 and act on the engaging disk 8 so as to activate it. The coils 10 are arranged on opposite sides of the engaging disk 8 and are not aligned with each other, so as to avoid mutual interference. In the technical solution shown, the coils 10 act advantageously on plates 11 forming the opposite main faces of the coupling disk 8. The plates 11 are fixed, in rotation, on the engaging disk 8, but can be separated from it by a small account sufficient to allow engagement of the disk itself with the flywheel 7 and, alternately, with the housing 2. In order to obtain the said engagement with the engaging disk 8, it is possible to provide, for example, screws which lock, with play, the plates 11, or plain teeth which mesh with the engaging disk 8.

Also provided are friction elements which are mutually engageable by means of substantial contact and operated between the flywheel 7, the engaging disk 8, in the region of its plate 11, and the stopping means 9 defined by the said housing 2. These friction elements are subdivided, in the example shown, into contact elements 12 engaged, on opposite sides, with the plates 11 and into counterelements 13 facing the contact elements 12 and engaged with the flywheel 7 and, alternatively, with the housing 2. All the friction elements 12 and 13 are shaped, in the example shown, in the form of a ring.

Advantageously, the contact elements 12 are made from a mixture of natural and synthetic products which have been suitably blended and impregnated with oil, in particular cork. On the other hand, the counterelements 13 are advantageously made of an oil-impregnated, sintered, metallic material. The said oil-impregnated, sintered, metallic material forms counterelements 13 of relatively large volume, considerably greater than that of the contact elements 12 made of cork. Moreover, the volume of the counterelement 13 engaged with the flywheel 7 is identical to the volume of the counterelement 13 engaged with the housing 2. Since the latter has a developed diameter greater than that of the former, it has a smaller cross-section, as can be seen from the drawing.

Obviously the dimensions shown are not binding for the purposes of the present patent.

Operation of the electromechanical friction clutch and brake unit according to the invention, described above mainly as regards structure, is as follows.

Initially the drive shaft 3 rotates at high speed, together with the flywheel 7 and the engaging disk 8, as does the associated driven shaft 4. In fact, as a result of the action of the coils 10 located adjacent to the flywheel 7, the plate 11 facing the flywheel 7 itself has contact elements 12 engaged with the corresponding counterelements 13. In normal operating conditions no sliding movement should occur between the said friction elements 12 and 13. It is pointed out that the plate 11 in question, while having its own contact elements 12 engaged with the associated counterelements 13, is slightly removed from the coils 10 adjacent to the flywheel 7. When the command is given to stop the driven shaft 4, the pulling effect exerted by the coils 10 located adjacent to the flywheel 7, ceases, and the coils 10 arranged opposite them, on the housing 2, come into operation. The latter attract the respective plate 11 of the engaging disk 8 which therefore brings its own contact elements 12 up against the corresponding counterelements 13. The difference in angular velocity between the said elements is very high, but the cork or similar material forming the contact elements 12 does not "burn", owing to the presence of oil which, by its viscosity, determines the coefficient of friction.

The engaging disk 8 is slowed down by a continuous action or also, if appropriate, by a series of pulses, until it reaches an angular velocity of substantially 250 to 300 revolutions a minute. The coils 10 then intervene again so as to stop the engaging disk 8 immediately, making it virtually integral with the housing 2. This braking action can be repeated a very large number of times without the risk of burning the main friction elements made of cork or similar materials. In fact, even when the latter have used up the oil inside them, the counterelements 13 made of sintered metallic material are able to supply for a very long time, by means of capillarity, the oil which has accumulated inside them. In practice, the sintered metallic material forms actual reservoirs of oil, and the oil is continually brought to the surface by the heat resulting from friction and by the sucking action produced by the same friction.

Numerous practical tests have shown that the invention achieves the proposed aims. In particular, the new electromechanical function clutch and brake unit has proved to be extremely reliable and the friction elements made of oil-impregnated, sintered, metallic material have shown themselves to be a practically inexhaustible reservoir of oil, in relation to the life of the brake, capable of functioning even when there is no oil at all inside the contact elements made of cork or similar material. Attention is also drawn to the simple and practical nature of the brake produced and that, in the rest position, the latter retains the engaging disk so that it is free and idle, thereby also allowing manual adjustments to be made.

The friction clutch and brake unit can be easily applied to different devices, in particular sewing machines.

The invention thus conceived may be subject to numerous modifications and variations, all falling within the scope of the inventive idea. For example, the function of oil reservoir may also be performed by other porous materials, and the porosity of the said materials may, if necessary, be replaced by suitable small channels or ducts or labyrinths. Also, all the features may be replaced by technically equivalent elements. The materials used, the shapes and the dimensions, may be of any nature or magnitude, in accordance with requirements.

What is claimed is:

1. An electromechanical friction clutch and brake unit for driving and stopping a rotation element, for example the needle actuating shaft of a sewing machine, said friction brake and clutch unit comprising:
    (a) a housing having a drive shaft and a driven shaft journalled in opposite side walls thereof;
    (b) a flywheel mounted within said housing on said drive shaft for rotation therewith;
    (c) a coupling disk mounted within said housing on said driven shaft;
    (d) friction elements made of a mixture of blended natural and synthetic materials treated and impregnated with oil on each side of said coupling disk;
    (e) counter elements mounted within the side wall of said housing in which said driven shaft is journalled and in said fly wheel adjacent said coupling disk, said counter elements being made of an oil impregnated sintered metal providing an oil reservoir capable of supplying oil by capillary action to said friction elements carried on said coupling disk after said friction elements have used up the oil with which they are impregnated; and
    (f) control and actuating means for selectively moving said coupling disk against said counter elements in said fly wheel and in such housing, as desired, to drive and stop said driven shaft, respectively.

2. Electromechanical friction clutch and brake unit as claimed in claim 1, wherein the said friction elements are made substantially of cork.

3. Electromechanical friction clutch and brake unit as claimed in claim 1, wherein the said friction elements are mounted on the said coupling disk, on opposite sides of the latter.

4. Electromechanical friction clutch and brake unit as claimed in claim 1, wherein the said counter elements are shaped substantially in the manner of rings and are mounted respectively on the said flywheel and on the side wall of said housing in which said driven shaft is journalled.

5. Electromechanical friction clutch and brake unit as claimed in claim 1, wherein the said control and actuating means comprise electromagnetic coils which are fixed to the housing and act on opposite faces of the said coupling disk.

6. Electromechanical friction clutch and brake unit as claimed in claim 5, wherein said coupling disk is defined by a plate which is fixed in rotation in relation to the disk itself and can be moved alternately toward the said flywheel and the side wall of said housing in which said driven shaft is journalled.

* * * * *